Dec. 12, 1933.  B. J. BUTLER  1,938,806
ROLL CAPACITOR
Filed Jan. 23, 1929

Inventor:
Benjamin J. Butler
By his Attorney
Philip Farnsworth

Patented Dec. 12, 1933

1,938,806

UNITED STATES PATENT OFFICE 1,938,806

ROLL CAPACITOR

Benjamin J. Butler, Somerville, Mass., assignor, by mesne assignments, to General Electric Company, a corporation of New York Application January 23, 1929. Serial No. 334,423

7 Claims. (Cl. 175—41)

This invention relates to capacitors made of flexible sheets of insulating and conducting material, especially the rolled paper type. It has for its object to increase the ability of such capacitors to resist breakdown voltage, and to provide an economical method of obtaining this result.

Capacitors of the roll type are commonly made of linen paper strips wound between aluminum foil strips. These are generally wound on a mandrel, removed, and afterwards flattened between metallic clamping plates of as large or larger length and width than the roll. As is customary the paper layers extend beyond the foil edges on each side of the strips so as to avoid any possibility of voltage breakdown occurring between foils around the edge of the dielectric. After clamping, the roll is ordinarily dipped in a paraffin or other appropriate wax for a few minutes under vacuum treatment or for a much longer time when not under vacuum and at a temperature at which the wax is very fluid to impregnate the paper. After cooling the wax suffices to maintain the layers tightly contiguous one another without the metallic clamp, which is removed in the cases where wax is used instead of oil as the paper impregnant.

Investigation has shown that failure of paper capacitors from overvoltage generally occurs as a puncture of the paper dielectric at the edges of the conducting elements or foils. Among the possible causes for failure in this locality is thought to be the probability of the foils being burred on their edges whereby greater pressure is exerted on localized portions of the dielectric at the edges of the foil than elsewhere.

According to this invention the ability of the roll capacitor to withstand breakdown voltage actually is increased as shown by the tests below, by applying greater pressure to the roll substantially inside the edges of the foil than is applied along or outside the foil edges so that there is no likelihood of the maximum pressure on the dielectric occurring along the foil edges. In other words the pressure along the foil edges is lessened with respect to the pressure well inside the foil edges.

Specifically under this invention the aforementioned desired difference in pressure between the foil edges and its main body portion is obtained by means of a pad of much greater thickness than the paper or foil. This pad may be located on the outside or at the center of the roll or inside the roll anywhere therebetween, the center being preferred from the standpoint of cost of assembly. This pad is of less width than the foil strips so that when the clamps as heretofore are applied to the roll the pressure along the foil side edges is less than the pressure inside such edges. The pad is preferably but not necessarily of a fibrous material and with no sharp corners so as to lessen any likelihood of the pad edges cutting into the paper or foil under clamping pressure. Another embodiment of the invention contemplates providing a pad extending around the outside of the roll, holding the foils under greater pressure inside their edges than at their edges and consisting of metal instead of fibrous material.

Referring to the drawing.

Figure 1:
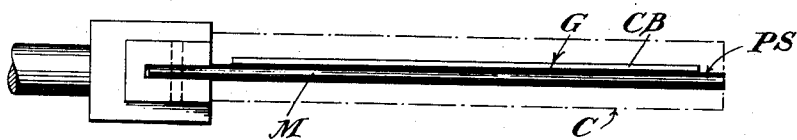
Fig. 1 is a side elevation of a winding mandrel with a chip board and paper sheet in position for winding the capacitor.
Figure 2:
Fig. 2 is an end view of Fig. 1.
Figure 3:
Fig. 3 is an end view of the finished capacitor showing the chip board and paper in position at the center of the roll.
Figure 4:
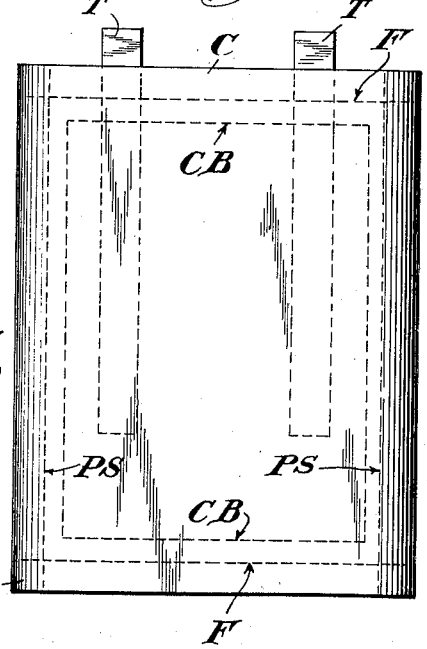
Fig. 4 is a plan view of the capacitor of Fig. 3.

In Fig. 1 the customary type of mandrel M is used for winding the capacitor. Contiguous one side is a fibrous pad or short strip of chip board C B as the compression member, of an area from a quarter to a half inch narrower than the mandrel, both longitudinally and transversely, and located inside the mandrel edges so as to be inside the edges of the finished roll and also inside the edges of the foil strips. A thickness of roughly between .01" and .0625" or $\frac{1}{16}$ has been found satisfactory for this interior chip board compression member. Secured to one face of the chip board by glue is a sheet of stiff paper P S which is of the same length and width as the mandrel. The dotted line C in Fig. 2 illustrates the outline of the capacitor roll when finished. Fig. 3 shows how the finished roll appears when removed from the mandrel, and after dipping and cooling the pad lying not only inside the roll but in the center of the roll, the stiff paper sheet P S extending beyond the edges of the chip board in both directions as is also shown more clearly in Fig. 4. This chip board compression member is of the approximate size illustrated and as seen in Fig. 4 is located intermediate the edges of the conducting material or foil F so that the roll is under greater pressure, i. e., wound tighter, over the area of the chip board C B, while the ends of the roll beyond the chip board will be less tightly wound, i. e., at the edges of the foil-strips.

In addition to the function of the chip board compression pad in creating pressure difference, it also is effective, by its flexibility, in permitting the overhanging edge portions of the stiff paper P S inside the roll to be flexed. Unless the paper P S is rounded or flexed it would be more likely to cut into the paper and foil of the roll especially when it is considered that the greatest stress on the capacitor layers occurs on the rounded ends of the flattened roll under the pressure to which subjected. This pressure with the materials used is just below 50 lbs. per square inch and this element of pressure is very important as the capacity may be varied as much as 50% with pressure changes on a paper roll type capacitor.

Figure 5:
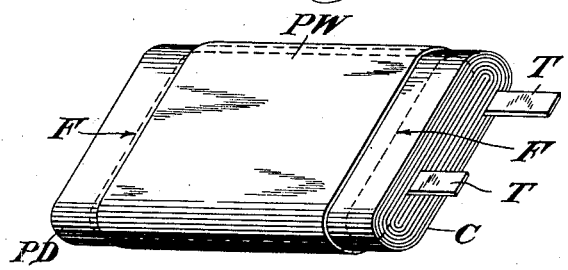
Fig. 5 is a perspective of a capacitor showing a modified embodiment of compression member.

Instead of inserting a compression pad at the center of the roll as at C B, of proper area to obtain a greater pressure on the finished roll inside the edges of foil F' than along said edges, a paper pad or wrapper P W in Fig. 5 may be used as the compression member. This wrapper about .010" thick i. e., much thicker than the paper dielectric strips, as in the case of C B, is applied so that the portion of the roll beneath the wrapper is under greater pressure than its ends beyond the wrapper when clamped inside the wrapper, and it will be noted that this wrapper has such area that it is well inside the edges of the foil F. In both embodiments illustrated at C B and P W the terminal tabs T are brought out from the interior foil surfaces in the usual manner.

Figure 6:
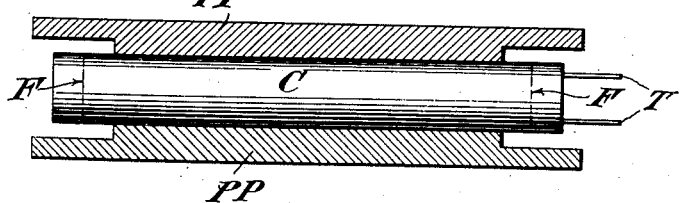
Fig. 6 is a sectional view through a pair of compression plates as an exterior compression means holding the capacitor in the condition of Fig. 5.

Fig. 6 shows a modified arrangement for obtaining the increased pressure by other external means specifically different from the external paper wrapper P W of Fig. 5. This form comprises pads in the form of pressure plate P P between which is clamped the roll C. As is the case with the paper compression member P W of Fig. 5 these pressure plates engage the capacitor roll well inside the foil edges so as to have the pressure along the edges of the foil less than the pressure within the main body portion of the condenser. Plates P P are used only during production and form no part of the product. In other words, the clamp plates used for the production of the embodiments shown in Figs. 1 to 5 (or at least their surfaces adjacent the roll) may be at least as long as the axial length of the roll itself because the inner or outer pad C B or P S is in place at the time of clamping; while in Fig. 6 no such pad is necessary in addition to the clamping plates P P because they serve the same purpose altho not of the preferred fibrous material as C B and P B. That is, as shown in Fig. 6, the area of the portions of the surface of the external means P P is the same in dimensions as the exterior means P W of Fig. 5, with the result that when the roll is compressed, the portions of the overlying dielectric and foil strips intermediate the lateral edges of the foil-strips are subjected to compression greater than their overlying portions along said foil-edges. After wax saturation and cooling of the roll, when wax is used as the impregnant for the dielectric paper, the plates P P of Fig. 6 are removed and the wax holds the layers tightly against one another as before and maintains the desired pressure difference along and inside but not at the foil edges. The paper wrapper in Fig. 5 and the pressure plates in Fig. 6 are about a half inch or more narrower than the width of foil strips.

That is, the distance between the side edges of the foil F and the neighboring side edges of the external pressure means, P W or P P, is a quarter of an inch or more. These pressure plates P P are held in their clamped position by any appropriate means such for example as clamping bolts or screws not shown. Where the edges of the plates P P would tend to cut into the paper and foil if square, such metal edges should be rounded.

To illustrate the advantages of this invention tests show that after subjecting the capacitors to 1500 volts of direct current for ten hours twice as many capacitors having the wrapper or external pressure means of Fig. 5 were found to be in good condition after the test as were found to be good with the paper capacitors not made under this invention, and a still larger number of capacitors were found to be in satisfactory condition when made with the $\frac{1}{16}$" thick chip board inside the roll, so that the best results seem to have been attained with use of the chip board illustrated in Figs. 1 to 4.

This invention is also applicable to oil impregnated paper roll capacitors in which event the metallic exterior clamping means of whatever type used cannot be removed after impregnation as is the case with the wax impregnated capacitors so that such means constitutes the permanent exterior pressure pad of the invention in an external location on the roll as in Fig. 5.

I claim:

1. A capacitor roll comprising flexible layers of dielectric material and foil, means to assist in the application of greater pressure on said capacitor inside said foil edges than outside and along them, said means comprising a pad shorter than the foil longitudinally of the roll, and located inside of both the foil edges and inside of the roll.

2. A capacitor roll comprising flexible layers of dielectric material and foil, means to assist in the application of greater pressure on said capacitor inside said foil edges than outside and along them, said means comprising a pad relatively thick compared to the thickness of the foil and dielectric and shorter than the foil longitudinally of the roll, said pad being located inside of the roll and inside of both of the foil edges.

3. The combination with a paper capacitor roll embodying sheets of conducting and dielectric material, of a pad contiguous a sheet of stiff paper on which the sheets are wound, said pad being arranged well inside the edges of the conducting material to give the roll greater pressure well inside said edges of conducting material than along and outside said edges when clamped, and said stiff paper being longer and wider than said pad to overhang the edges thereof.

4. The combination with a capacitor roll including sheets of conducting and dielectric material, of a pad on which the sheets are wound and much thicker than the individual roll-sheets and located in the center of the roll, said pad being arranged well inside the edges of the conducting sheets to give the roll lower pressure along said edges of the conducting sheets than at the areas of the conducting sheets parallel to the pad when the roll including said much thicker pad is subjected to roll-compressing pressure.

5. The combination with a capacitor roll including sheets of conducting and dielectric material, of a pad much thicker than the individual roll-sheets and located on the outside of the roll; said pad being arranged well inside the edges of the conducting sheets to give the roll lower pressure along said edges of the conducting sheets than at the areas of said conducting sheets parallel to the pad when the roll including the thicker pad is subjected to roll-compressing pressure.

6. The combination with a capacitor roll including sheets of conducting and dielectric material, of a pad much thicker than the individual roll-sheets and arranged well inside the edges of the conducting sheets to give the roll lower pressure along said edges of conducting material than at the areas of the conducting sheets parallel to the pad when the roll including said much thicker pad is subjected to roll-compressing pressure.

7. The combination with a capacitor roll including sheets of conducting and dielectric material, of a chip-board pad much thicker than the individual roll-sheets and arranged well inside the edges of the conducting sheets to give the roll lower pressure along said edges of the conducting sheets than at the areas of the conducting sheets parallel to the pad when the roll including the chip-board pad is subjected to roll-compressing pressure.

BENJ. J. BUTLER.